Patented July 11, 1950

2,515,157

UNITED STATES PATENT OFFICE 2,515,157

TREATMENT OF CORN STEEPWATER

Glenn W. Parsons, Decatur, Ill., assignor to A. E. Staley Manufacturing Co., Decatur, Ill., a corporation of Delaware No Drawing. Application December 8, 1945, Serial No. 633,849

6 Claims. (Cl. 195—103)

This invention relates in general to the treatment of corn steepwater. More specifically, it has to do with the treatment of corn steepwater under acid conditions with a material furnishing aluminum cations for the purpose of precipitating therefrom a salt of phytic acid.

Phytin is a generic term applied to the salts of phytic acid occurring in plants, and may be obtained as a precipitate when a suitable acidic extract of plant material, such as corn steepwater, is neutralized. The phytin in corn steepwater consists chiefly of a calcium-magnesium phytate.

Salts of phytic acid are also precipitated from corn steepwater when the latter is treated with soluble salts of the alkaline earth metals, or of the heavy metals such as iron and copper. Since phytic acid is polybasic, having a theoretical maximum of 12 available hydrogen atoms, the composition of phytin, with respect to bound metals, will vary widely, depending upon many different conditions, and especially upon the kind and concentration of metal cations present in the steepwater.

The phytin obtained by neutralizing corn steepwater with a base is contaminated with appreciable proportions of protein-like compounds, inorganic phosphates, and colored substances. A less contaminated phytin, or salt of phytic acid, is obtained from corn steepwater if it is precipitated from an acidic liquor, i. e., by treating the steepwater at its normal acidity of about 3 to 5 pH with a soluble salt of an alkaline earth metal or of a heavy metal. By this process the potentially contaminating materials remain dissolved in the acidic mother liquor.

The present invention provides a new and useful means for precipitating phytic acid as an insoluble salt in high yield from acidic corn steepwater. The invention embodies the principle of dividing the steepwater into two parts, a liquor and a precipitate, both of which have superior qualities with respect to many different uses. It has been found, for example, that the liquor is an excellent nutrient for microorganisms in the production of antibiotic substances, being superior to ordinary steepwater with respect to yield of such substances and ease of carrying out the various manufacturing operations. An example of such use is the culturing of *Penicillium notatum* for the production of penicillin. The liquor is also a superior nutrient for the culturing of microorganisms in general, especially the yeasts, molds, and bacteria. Owing to its lighter color, in comparison with the original steepwater, and to the substantial absence therein of materials that precipitate when it is heated, or neutralized, the liquor is also a superior adjunct in the preparation of foodstuffs for human beings and livestock. The precipitate, consisting chiefly of an aluminum magnesium salt of phytic acid, is less contaminated with co-precipitated colored and nitrogenous materials than is the case when phytin is precipitated from steepwater in the usual manner by neutralizing the steepwater with a base. Hence the precipitate is a superior raw material in the preparation of phytic acid and inositol, and for other uses in which the presence of colored and nitrogenous materials would be objectionable.

The utility of the liquor fraction as a nutrient for microorganisms is claimed in my copending application, Serial No. 97,311, filed June 4, 1949.

Steepwater is produced when corn starch is manufactured by what is known as the wet-milling process. The first step in this process is to soak the maize kernels in a dilute solution of sulfurous acid at a temperature of from about 110 to 130° F. for a period of time ranging from about 40 to 48 hours. The chief purpose of this soaking or steeping operation is to soften and swell the kernel so as to insure a satisfactory milling operation resulting in a clean separation of starch from germs, bran, and protein. The steeping operation is a fundamental part of the wet-milling starch manufacturing process, and the conditions under which this operation is conducted cannot be varied greatly without causing trouble throughout the process.

During steeping, the maize kernels gradually swell and soluble materials therein pass into the steepwater. The sulfurous acid present serves a dual purpose; it inhibits the growth of putrefactive organisms in the steepwater, and it exerts a specific loosening effect upon the proteinous material that binds the starch granules together in the kernel. The sulfurous acid does not inhibit all bacterial action. Throughout the entire steeping process, a certain type of lacto-bacillus actively ferments soluble sugars in steepwater, converting them into lactic acid. The lactic acid produced, which may amount to 10 to 20 per cent of the dissolved substances in the steepwater, contributes to the softening effect on the kernels and is a distinct aid to the subsequent milling operations.

Corn may be steeped batchwise, or in a countercurrent system, or by a combination of the two methods. The sulfurous acid concentration in the initial steeping water is made up to the desired value of about 0.2 per cent (calculated as sulfur dioxide) by passing sulfur dioxide gas into make-up water, after which no more is added. The initial pH of the steepwater is low (below 4) because of its sulfurous acid content. Much of the sulfurous acid disappears after a few hours steeping. Meanwhile lactic acid fermentation begins and generation of this acid keeps the steepwater pH down around a value of about 4. As the solubles content of the steepwater increases, the steepwater density rises until at the end of the operation it lies within the range of about 3° to 7° Baumé, the final value depending to a considerable extent upon the steeping system used. The steepwater thus produced, known as "light" steepwater, is sent to evaporators and concentrated to "heavy" steepwater having a density of about 25° to 30° Baumé. The bulk of the "heavy" steepwater has been mixed, in the past, with the corn gluten and bran as an important ingredient in corn gluten stock feed. Occasionally some "heavy" steepwater has been sold to yeast growers as a nutrient for the yeast.

Corn steepwater contains an extremely complex mixture of substances among which are protein hydrolytic products of assorted molecular weights, reducing sugars, lactic acid, phytin, "B" complex vitamins, organic acids, amines, and inorganic anions and cations. Undoubtedly the steepwater also contains many other substances that have not yet been detected therein. Concentrated steepwater of 30° Baumé density contains about 52 per cent dry substance by weight. It is a brown, viscous liquid which upon standing at room temperature deposits a soft sludge consisting in part of protein-like material, magnesium and calcium lactates and calcium and magnesium phytates.

In regard to the use of corn steepwater as a nutrient for molds of the genus Penicillia, in the manufacture of penicillin, it appears that the steepwater contains one or more substances which exert a specific effect upon the mold. That is, the mold is caused to produce more penicillin than it otherwise would during normal growth in the usual synthetic media containing salts, carbohydrates, and nitrogen compounds. As an alternative possibility, the steepwater may contain an unusually favorable combination of growth factors in its vitamins, amino acids, carbohydrates, and salts that is responsible for the increased penicillin production by the mold.

Penicillin is produced by preparing a culture broth for a selected penicillium mold, commonly *Penicillium notatum*, comprising a dilute aqueous solution of nutrient ingredients including salts, sugars, and nitrogen compounds, sterilizing the culture medium by autoclaving it, cooling the medium, inoculating it with spores of the mold, allowing the mold to grow under optimum conditions of aeration, pH, and temperature until the penicillin content of the culture medium reaches a maximum value, and recovering penicillin from the medium by suitable extraction and concentration procedures.

The outstanding utility of corn steepwater in the production of penicillin has made its use most desirable, but it has several drawbacks that have caused trouble. For one thing, steepwater contains much extraneous material that is either of no benefit or injurious to the penicillin-producing ability of the mold, and interferes with the recovery of penicillin from the broth culture. Also, as mentioned before, the concentrated steepwater deposits a sludge which at times becomes almost solid upon standing. This behavior has been a continuous source of difficulty in transporting and storing the material. It is not feasible to provide a steepwater of lighter density, containing more water, because the less concentrated liquor is extremely susceptible to a bacterial spoilage that ruins it as a nutrient for the mold. Another fault is that the steepwater contains substances that are soluble in the cold acidic liquor but become insoluble when the liquor is heated or made less acid. For example, when the mold culture medium, consisting chiefly of a dilute aqueous solution of the steepwater and a sugar (usually lactose) and adjusted to a pH of about 4 to 5, is sterilized by autoclaving to kill any contaminating organisms before inoculating the culture medium with penicillium spores, it deposits an objectionable precipitate. The deposited material coats surfaces such as the insides of glass bottles used in the surface culture method of manufacturing penicillin, and is difficult to scrub off afterward. In addition, as the mold grows, the pH of the culture medium rises to values around 7 to 8 with the result that calcium and magnesium salts of phytic and phosphoric acids, and other materials, are precipitated which interfere in the subsequent recovery of penicillin from the medium.

Precipitation of phytin from corn steepwater by moderately raising the pH with caustic soda eliminates the foregoing disadvantages of the steepwater as a mold nutrient. Such precipitation, however, reduces the nutrient activity of the liquor in an amount that is proportional to the increase in liquor pH. This indicates that possibly some steepwater ingredient, essential to high production of penicillin by the mold, is being progressively removed with the phytin precipitate as the liquor pH is raised. It was conceived that in order to correct the aforementioned objectionable features of untreated corn steepwater without impairing its nutrient activity, adequate amounts of phytin should be removed from it at low pH, possibly at its normal acidity of about 3 to 5 pH. A search for satisfactory methods to accomplish such removal of phytin was not successful until it was unexpectedly discovered that aluminum cation was an excellent precipitant of phytin from the acidic steepwater.

The present invention eliminates all the foregoing disadvantages of corn steepwater as a mold nutrient in the production of penicillin. In addition, it provides for an increase in the yield and quality of penicillin over that obtained with ordinary corn steepwater.

Among the objects of this invention are the following, all relating to treatment of corn steepwater:

1. Provision of a novel treatment of corn steepwater by dividing it into two parts, a liquor and a precipitate, both of which have superior qualities for many different uses.

2. Provision of a nutrient for the culturing of microorganisms in the production of antibiotic substances.

3. Provision of a superior nutrient for the growth of penicillin-producing molds.

4. Provision of a nutrient for penicillin-producing molds which does not yield an objectionable precipitate in the culture medium when the medium is sterilized by autoclaving prior to its inoculation with spores of the molds.

5. Provision of a nutrient for penicillin-producing molds which does not yield an objectionable precipitate in the culture medium during growth of the molds.

6. Provision of a concentrated liquid nutrient for penicillin-producing molds which does not deposit an objectionable sludge during shipment or storage.

7. Provision of a clean nutrient for penicillin-producing molds which results in higher recovered yields and quality of penicillin because of the freedom from troublesome impurities.

8. Provision of a nutrient for penicillin-producing molds which, by comparison with ordinary corn steepwater, stimulates the production of penicillin by the molds.

9. Provision of an improved nutrient for the culturing of microorganisms in general, especially the yeasts, molds, and bacteria.

10. Provision of a nutrient liquor which, because of its light color and freedom from toxic materials and materials that precipitate when the liquor is neutralized or heated, is an improved adjunct in the preparation of foodstuffs for human beings and livestock.

11. Provision of a new salt of phytic acid which, because of its reduced contamination with nitrogenous and colored materials and freedom from heavy metal ions, is an improved raw material for many uses, among them being the preparations of phytin and inositol.

12. Provision of a process yielding the foregoing objectives that is simple and economical in operation.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

Briefly, the invention contemplates mixing corn steepwater at its normal acidity of about 4 pH with a material which will furnish aluminum cations in the acidic liquor, heating the mixture to promote the most efficient precipitation of the aluminum-magnesium phytate, and separating liquor from precipitate by any suitable means.

The treatment of the steepwater may be carried out as follows: Corn steepwater at about 4 pH and concentrated to about 15° Baumé is placed in a vessel equipped with an agitator and a heating device. Ordinary granular alum (hydrated aluminum sulfate) in amount up to about 20 per cent of the weight of steepwater solids, is stirred into the steepwater. The addition of the alum produces an immediate precipitate of aluminum-magnesium phytate. The mixture is stirred and heated to about 70° C. to promote the phytin precipitation. It is then immediately filtered while hot. The filter cake is washed free of mother liquor with warm water, and the washings are combined with the main filtrate.

The wet filter cake may be used as is, or it may be dried beforehand. Likewise, the liquor may be used directly in its diluted state, but in general, it will prove more desirable to concentrate it further to inhibit spoilage and to reduce storage and shipping costs. Preferably the concentration is conducted under reduced pressure and carried to a liquor density of about 30° Baumé. Additional solids, mostly lactic acid salts, separate during and after the concentration. For some uses, it may be desirable to remove these from the liquor. This is preferably accomplished by cooling the concentrate to about 25° C., agitating it gently for a day or so, and then filtering or centrifuging it. The clarified liquor is a stable liquid product that has a greatly reduced tendency to mold or spoil during storage. It is non-toxic, free of materials that precipitate when it is heated, lighter in color than untreated steepwater concentrated to the same degree, or equally concentrated steepwater from which the phytin has been precipitated with alkaline agents such as lime or caustic soda.

Permissible adjustment of variable factors in the process, within ranges that provide a satisfactory treatment of the steepwater, will appear in the following discussion of the individual variables.

*Raw material.*—The corn steepwater used may vary considerably in its history as to:

(a) *Fermentation.*—It may have been fermented with lacto-bacilli to widely varying degrees; i. e., conversion of soluble sugars to lactic acid may vary from 0 to 100 per cent. Regarding use of the liquid product of corn steepwater treated according to this invention in the production of penicillin, however, it has been found that highly fermented steepwater provides higher yields of penicillin by the submerged growth method than does the unfermented or partially fermented kind. For example, with only about 2 per cent reducing sugars in the 30° Baumé liquid product, by virtue of prior fermentation of the sugars with lacto bacilli commonly present in corn steepwater, the yield of penicillin is about 20 per cent higher than it is when the 30° Baumé liquid product contains about 8 per cent reducing sugars.

(b) *Heat treatment.*—The steepwater may have been heated to widely varying temperatures, for example, up to 100° C., in concentrating it or removing volatile constituents, such as sulfur dioxide.

(c) *Steeping method.*—It may have been obtained by any of the commercial corn steeping processes, whether of the continuous or batch type.

*Precipitant.*—Any aluminum compound or mixture of aluminum compounds is satisfactory, provided it furnishes a concentration of aluminum cations sufficient to produce a precipitate; and provided further that it does not introduce objectionable anions, such as those that are toxic to microorganisms and to animals. Because of their cheapness and non-toxic anions, ready availability, and ease in handling, aluminum sulfate and aluminum chloride are the preferred aluminum compounds. All that is required of the aluminum compound used is that it react with the steepwater components in a suitable fashion, by yielding a concentration of aluminum cations great enough to exceed the solubility product of the aluminum-magnesium phytate and thus cause its precipitation. Thus, hydrated aluminum oxide, or so-called aluminum hydroxide, despite its very low solubility in water alone, operates satisfactorily in the normal acid medium of steepwater because it is sufficiently soluble therein to provide the required concentration of aluminum cations. Also, since aluminum metal yields aluminum cations in acid media, aluminum metal itself may be used as a precipitant for phytin in acidic steepwater. A solution of aluminum in acid is also a satisfactory precipitant.

*Proportions of precipitant.*—When ordinary alum (hydrated aluminum sulfate) is used, satisfactory results are obtained, for example, in the range of one to 20 per cent alum based on the weight of dry substance in the steepwater treated. This corresponds to a range of about 0.5 to 10 per cent of dry alum and about 0.08 to 1.6 per cent aluminum. Suitable proportions of other aluminum compounds, such as the nitrate, chloride, and hydrated oxide, when used, lie, for example, in the range of 0.08 to 1.6 per cent aluminum based on the steepwater dry substance. In general, any proportion of aluminum cation that produces a precipitate may be used. The proportion selected will vary with the intended use of the products.

The influence of proportion of precipitant on yield of precipitate is indicated by the following dry weights of washed precipitate obtained by adding varying amounts of hydrated alum to 100 ml. of 30° Baumé steepwater at 4 pH and heated to 100° C.; 2.4 gms. at 2.5 per cent alum (based on steepwater solids); 5.1 gms. at 5.0 per cent alum; 7.5 gms. at 7.5 per cent alum; 11.1 gms. at 10.0 per cent alum; 17.3 gms. at 15 per cent alum; and 20.4 gms. at 20 per cent alum.

When a high yield of the aluminum-magnesium phytate is the primary interest, it will be desirable to use a high proportion of alum, but if uses of the remaining liquid portion of the steepwater are of primary interest, it may be desirable to employ low proportions of alum. This is especially true if nutrient uses of the liquor are considered. For example, with respect to use of the liquor as a nutrient for penicillium mold in the production of penicillin, it is not desirable to remove all the phytin from the steepwater. To do so reduces its value as a mold nutrient. Instead, it is desirable that only enough phytin be removed to overcome the earlier stated difficulties associated with the use of ordinary corn steepwater as a nutrient for penicillium mold.

*Temperature.*—Temperature at which the steepwater is treated with the aluminum compound may vary over a wide range, for example, from 0 to 100° C. The preferred range is from about 50 to 80° C. Below 50° C. the effect of temperature on precipitation of the aluminum-magnesium phytate is not large, and although precipitation of the salt does increase with increasing temperature above 80° C., darkening of the liquor sets in at around 80° C. and becomes quite noticeable at 100° C.

The following dry weights of washed precipitate obtained by adding 8 per cent hydrated alum (based on the steepwater dry substance) to 100 ml. of 30° Baumé steepwater at 4.3 pH, and at varying temperatures, illustrate the effect of temperature on the precipitation: 3.6 gms. at 20° C.; 4.0 gms. at 40° C.; 6.1 gms. at 60° C.; 6.8 gms. at 80° C.; and 7.2 gms. at 100° C.

*pH of treatment.*—As pointed out earlier, precipitates of phytic acid salts obtained from acidic corn steepwater are less contaminated with objectionable impurities than is the case when the precipitation occurs under neutral or alkaline conditions. Optimum results are obtained in the pH range of about 3 to 5, but satisfactory results are secured with acidic steepwaters in general, i. e., at pH values from about 0.5 to 7.

Because of its slight solubility in acid, the yield of aluminum-magnesium phytate precipitated from corn steepwater according to this invention decreases slowly with decreasing pH of the mother liquor. For example, the following dry weights of washed precipitate were obtained by adding 8 per cent hydrated alum (based on steepwater dry substance) to 100 ml. of 30° Baumé steepwater at 100° C. and adjusted to varying pH values with hydrochloric acid and sodium hydroxide: 6.2 gms. at 3.1 pH; 6.8 gms. at 3.6 pH; 7.3 gms. at 4.0 pH; and, 7.6 gms. at 4.5 pH.

The pH of corn steepwater normally lies within the range of about 3 to 5, and is usually in the neighborhood of about 4. Addition of an acid-reacting aluminum salt, such as aluminum sulfate or aluminum chloride, to corn steepwater at 4 pH lowers its pH only a few tenths of a unit.

*Density of treated steepwater.*—This may vary from that of the original light steepwater, about 3° Baumé up to the final desired value of about 30° Baumé, but the preferred value is around 15° Baumé.

*Duration of treatment.*—Precipitation of the phytate is rapid, especially at elevated temperature, and the treated steepwater can be filtered as soon as it has been heated to the desired temperature. There is no disadvantage to delay in filtration, however, unless the mixture be held hot for extended periods of time. In this case, slight darkening of the liquor may occur.

The following specific example will illustrate the treatment: 2,000 gallons of 15° Baumé steepwater, obtained by vacuum evaporation of a larger volume of 4° Baumé steepwater, was placed in a tank equipped with an agitator and a steam coil. To this liquor, having a pH of 4.0 and containing 4,440 pounds of dry substance, was added 222 pounds of granular hydrated aluminum sulfate (papermakers alum) with stirring and heating to 72° C. Precipitation of the phytate ceased when all the alum had been added and the mixture had been stirred for a few minutes at 72° C. The mixture, now at a pH of about 3.8, was filtered hot in a filter press. The filter cake was washed with warm water in the press until it was substantially free of mother liquor, and the washings were combined with the main filtrate. The weight of wet washed filter cake was 1,200 pounds (500 pounds of dry substance), the volume of main filtrate was 1,880 gallons, the washings amounted to 370 gallons, and the volume of combined main filtrate and washings was 2,250 gallons.

For some purposes, as in the preparation of phytic acid and of inositol, the filter cake obtained in the preceding example may be used in its wet state. For other purposes, it may be desirable to dry the cake beforehand.

The filtrate, or the combined filtrate and washings, obtained in the preceding example may also be used as it is for many purposes. As mentioned earlier, it may be used as a superior nutrient for the growth of penicillium mold in the production of penicillin, as a nutrient for microorganisms in general, especially molds, yeasts, and bacteria, and as a useful adjunct to foods for human beings as well as live stock. In case the liquor is not used immediately, it will generally be desirable to concentrate it to a density of about 30° Baumé. As mentioned above, this will greatly reduce danger of its spoilage by putrefaction or undesirable fermentation, and will reduce storage and shipping costs. Preferably the concentration should be carried out under reduced pressure. Crystalline solids, mostly salts of lactic acid, will appear in the liquor during and after its concentration. Their removal is optional, but usually desirable, because sometimes their presence causes the concentrated liquor to become semi-solid and difficult to pump or transfer.

The proportions of bound aluminum and magnesium in the phytic acid salt obtained by the process of this invention will vary, depending upon many factors, especially the quality of the steepwater and the proportion of added aluminum compound.

All liquor densities mentioned hereinbefore and in the appended claims are based on a liquor temperature of 15° C.

Reducing sugar contents of liquors mentioned hereinbefore and in the appended claims were determined by the Lane-Eynon method after interfering nitrogenous materials were removed from the liquor by diluting it, adding some zinc sulfate, then neutralizing it with caustic soda solution using phenolphthalein as indicator, and centrifuging off the precipitated zinc hydroxide.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process of treating corn steepwater to produce a nutrient liquor which comprises mixing with said steepwater under acid conditions an aluminum compound furnishing aluminum cations in amount sufficient to precipitate an aluminum-containing salt of phytic acid from the mixture, separating the precipitate and recovering the liquor.

2. A process of treating corn steepwater to produce a nutrient liquor which comprises mixing with said steepwater under acid conditions an aluminum compound that will furnish aluminum cations in amount sufficient to precipitate an aluminum-containing salt of phytic acid from the mixture when it is heated, heating said mixture to a temperature of not less than about 50° C. to precipitate said salt, separating the precipitate and recovering the liquor.

3. A process of treating corn steepwater to produce a nutrient liquor which comprises mixing with the steepwater under acid conditions an aluminum compound furnishing aluminum cations in amount sufficient to precipitate an aluminum-containing salt of phytic acid from the mixture when it is heated, the acidity of said mixture lying within the range of about 3 to 5 pH, heating the mixture to precipitate said salt, separating the precipitate and recovering the liquor.

4. The process as defined in claim 1 in which the source of aluminum cations is aluminum sulfate.

5. The process as defined in claim 1 in which the source of aluminum cations is aluminum chloride.

6. The process as defined in claim 1 in which the source of aluminum cations is aluminum nitrate.

GLENN W. PARSONS.

REFERENCES CITED

The following references are of record in the file of this patent:

UNITED STATES PATENTS

| Number | Name | Date |
|---|---|---|
| 1,716,286 | Wagner | June 4, 1929 |
| 1,894,647 | Wagner | Jan. 17, 1933 |
| 2,170,274 | Morgan | Aug. 22, 1939 |
| 2,298,623 | Jurgensen et al. | Oct. 13, 1942 |
| 2,423,873 | Coghill et al. | July 15, 1947 |

OTHER REFERENCES

Kennedy, "Corn Steep Water as Nutrient for Penicillin," a paper presented at Penicillin Technical Meeting, January 21—22, 1944, New York, 4 pages.

Summary of Discussion at the Penicillin Technical Meeting, Hotel Astor, New York, Jan. 21-22, 1944, page 7.

Moyer et al., Jr. Bacteriology, Jan. 1946, pp. 57 and 73.